July 3, 1923.

S. S. EMERY

LUBRICATION RECORD

Filed Nov. 22, 1921

1,460,576

LUBRICATION RECORD.

| PARTS | | How Often (Miles) | Last Lubrication | |
|---|---|---|---|---|
| | | | Miles | Date |
| SPRINGS | Front | 250 | | |
| | Rear | 250 | | |
| STEERING GEAR | Housing | 250 | | |
| | Drag Links | 1000 | | |
| | Cross Rods | 250 | | |
| | King Bolts | 250 | | |
| WHEELS | Front Inspected | 500 | | |
| | Front Greased | 2000 | | |
| | Rear Inspected | 500 | | |
| | Rear Greased | 2000 | | |
| UNIVERSALS | Front | 500 | | |
| | Rear | 500 | | |
| PINION | | 1000 | | |
| ENGINE | Filled | 100 | | |
| | Drained | 1000 | | |
| | Washed | 3000 | | |
| TRANSMISSION | Filled | 1000 | | |
| | Inspected | 500 | | |
| | Washed | 3000 | | |
| DIFFERENTIAL | Filled | | | |
| | Inspected | 1000 | | |
| | Washed | 3000 | | |
| Motor-Generator | | 1000 | | |
| Axel Brakes | | 1000 | | |
| Emergency Brakes | | 1000 | | |
| Pedals | | 500 | | |
| Steering Wheel | | 1000 | | |
| BATTERY | Filled | 200 | | |
| | Tested | 500 | | |

A.   B.   C.   D.   E.

Inventor
Sidney S. Emery.
By A. J. O'Brien
Attorney

Patented July 3, 1923.

1,460,576

UNITED STATES PATENT OFFICE.

SIDNEY S. EMERY, OF DENVER, COLORADO.

LUBRICATION RECORD.

Application filed November 22, 1921. Serial No. 516,916.

*To all whom it may concern:*

Be it known that I, SIDNEY S. EMERY, a citizen of the United States, residing at the city and county of Denver and State of Colorado, have invented certain new and useful Improvements in Lubrication Records; and I do declare the following to be a full, clear, and exact description of the invention, such as will enable others skilled in the art to which it appertains to make and use the same, reference being had to the accompanying drawings, and to the characters of reference marked thereon, which form a part of this specification.

This invention relates to means for enabling a driver of an automobile to conveniently keep a record of the lubrication and cleaning thereof.

It is a well recognized fact that the average automobile suffers severely through improper lubrication, and that the deterioration resulting therefrom amounts to staggering sums.

It is the object of this invention to provide a chart on which every separate place to be lubricated is enumerated, and the permissible number of miles between each lubrication given. The chart is also provided with two columns, one in which is entered the speedometer reading, and the other the date on the day of lubrication. By this means an inspection of this record will clearly show what parts are in need of lubrication or cleaning.

In order to more clearly describe my invention, I shall have reference to the accompanying drawing, in which I have shown one specific embodiment thereof.

The chart illustrated on the drawing has five vertical columns which I have designed as A, B, C, D and E. Column A is intended to be used for the designation of the several groups, as for example, springs, steering gear, wheels, engine, differential, etc. Column B is divided by horizontal lines into as many spaces as may be necessary to properly take care of the several parts of each group; thus, after the group "Springs" I provide two parallel spaces, one labeled "Front" and the other "Rear," and in column C, following the part enumerated, is a figure giving the number of miles that the car can properly be run between each lubrication. Columns D and E are labeled "Last lubrication," and the top of column D is marked "Miles" and is intended to receive an entry of the speedometer reading when the part is lubricated, whereas column E is marked "Date" and is intended to have entered therein the date of the last lubrication. The same scheme is followed throughout for every group and part, although it is obviously not necessary to enumerate every oil hole and grease cup separately, as some things must of necessity, and properly so, be left to the general intelligence of the person whose duty it is to lubricate the machine. It will be noted that after some of the groups, for example "Transmission" I have three sub-heads, namely: (*a*) Filled; (*b*) Inspected; (*c*) Washed; with the proper number of miles between each indicated in column C.

My chart may be made of any suitable material, such as paper, celluloid or of slate. The various column lines and items such as those found in columns A, B and C must be permanently printed thereon, whereas columns D and E are left blank and are intended to be filled in with a pencil at each lubrication or inspection, and must of course have a surface that will permit the entries to be erased with ease. Where the chart is made on a slate, the permanent lines and entries may be engraved thereon with a sharp tool, and the entries made in columns D and E by means of an ordinary slate pencil.

It is my intention that the record charts shall be specially prepared to correspond with the requirements of the particular car with which it is to be used. Thus, a Packard will have some items that are not found on a Ford, and the same is true with respect to every make of car. The record chart may be hung in a convenient place in the garage where it can be seen and inspected by the driver of the car whenever he desires to do so. By comparing the speedometer reading with that given in column D, and referring to column C, he can readily determine what parts, if any, need attention at that time. If he finds one item that needs to be attended to, he confers upon it the needed attention and enters the speedometer reading in column D and the date in column E.

My chart is extremely useful and very convenient, and is well adapted to be used for advertising purposes, as the margin surrounding the chart proper can be made of any desired size and utilized for such a purpose.

Having now described my invention, what I claim is—

1. A lubrication record comprising a chart having a plurality of vertical columns and transversely ruled spaces, one of said columns containing a list of the parts to be lubricated, another column containing figures representing the number of miles that may properly elapse after each lubrication, and two parallel columns adapted to receive an entry of the date and the speedometer reading at the last lubrication.

2. A lubrication record comprising a chart having a plurality of vertical columns and transversely ruled spaces, one of said columns containing a list of groups, another a list of parts to be lubricated, a third column containing figures representing the number of miles that may properly elapse after each lubrication, and two parallel blank columns adapted to receive and to have erased therefrom an entry of the speedometer reading at the last lubrication and the date thereof.

3. A lubrication record comprising a chart having a plurality of vertical columns and transversely ruled spaces, one of said columns containing a list of the parts to be lubricated, figures representing the number of miles that may properly elapse after each lubrication, located in operative relation thereto, and a column adapted to receive an entry of the speedometer reading at the last lubrication.

In testimony whereof I affix my signature.

SIDNEY S. EMERY.